Nov. 25, 1952         A. FREUND         2,619,198
WEAR COMPENSATING DEVICE FOR VEHICLE BRAKES
Filed Nov. 22, 1947
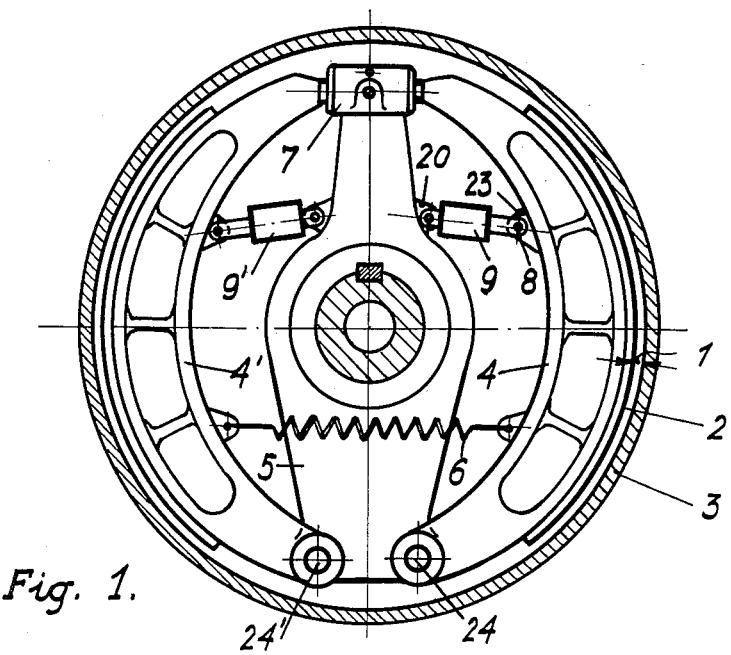
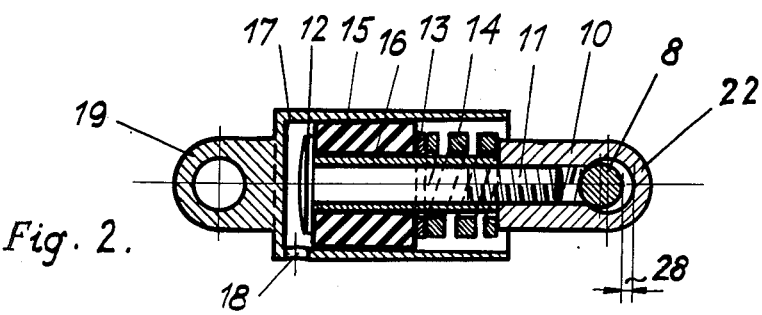
INVENTOR: Alois Freund.
by *Arnold Acheson*
Attorney.

Patented Nov. 25, 1952

2,619,198

UNITED STATES PATENT OFFICE 2,619,198

WEAR COMPENSATING DEVICE FOR VEHICLE BRAKES

Alois Freund, Haifa, Palestine

Application November 22, 1947, Serial No. 787,601

4 Claims. (Cl. 188—79.5)

This invention generally relates to devices for the readjustment of hydraulically operated brake shoes, and is particularly directed to a device for automatically effecting the necessary adjustments.

As the brake lining and brake drum surface of hydraulical vehicle brakes are worn off, the gap existing between the lining and drum in the inoperative position grows wider and must be readjusted for avoiding too long a travel of the brake pedal and keeping the brake in proper working order. This readjustment is usually effected by means of cam members provided in the braking drum, and requires a competent workman. This positive or manual readjustment may be delayed until the gap has become so wide that the brakes begin to become faulty and constitute a danger to the driver.

The present invention has as its primary object to provide means for the automatic and instantaneous readjustment of the gap between the brake lining and inner drum surface as such gap becomes wider by reason of the wear and tear to which both the lining and drum surface are subject, with a view to keeping the width of the gap in the inoperative position of the brake virtually constant until the lining has nearly been used up and must be replaced.

The gap-adjusting device according to this invention comprises a cylinder having an elastically deformable piston inserted therein and formed with an axial bore, a rod extending through the axial bore of the piston and projecting from the cylinder, springy means for compressing said piston in the axial direction to cause its radial expansion into frictional engagement with the inner surface of the cylinder, and means for pivotally connecting the device at its opposite ends, that is, the outer end of the piston rod and the opposite cylinder end, to a brake shoe and the brake shoe bracket respectively, preferably at points remote from the point of articulation of the brake shoe to the bracket and with play or clearance being provided in the pivotal connecting means so that the piston is displaced within the cylinder only when the movement of the brake shoe exceeds a predetermined distance.

The accompanying drawings illustrate an embodiment of the invention by way of example only.

In the drawings:

Figure 1 is a sectional view of a hydraulic brake drum of conventional design provided with a pair of gap readjusting devices according to an embodiment of the invention; and Figure 2 is a longitudinal section on a larger scale of one of said readjusting devices.

Turning to the drawings, a brake drum 3 is there illustrated and contains a brake shoe bracket 5 and two brake shoes 4, 4' articulated to one end of the bracket at the points 24, 24' respectively, with the opposite ends of the shoes being connected to the hydraulic brake cylinder 7, and a retracting spring 6 connecting the brake shoes across the bracket, all this being known in the art. The brake shoes have brake linings 2 fixed thereto, which, in the inoperative position shown in Figure 1, are separated by gaps 1 from the inner surface of the brake drum. The gap 1 is usually maintained rather narrow in order to avoid the necessity of having a relatively large brake pedal motion for the braking action. Accordingly, even a relatively small widening of the gap by wear and tear of the lining and/or drum surface makes necessary a proportionately much longer brake pedal stroke which may even exceed the actual working length of the pedal so that the brakes no longer function properly.

According to this invention, self-readjusting devices are provided which in Figure 1 have been referred to in a general manner by the reference numerals 9 and 9'. Each of the devices 9 and 9' comprises a cylinder 17 closed at one end and provided at its bottom or closed end with an apertured ear 19 which receives a suitable pin carried by a lug 20 secured to the bracket 5 at a point on the latter nearer the hydraulic cylinder 7 than the hinge point 24 and serves to mount the cylinder on the bracket. The cylinder 17 contains a piston 15 of an elastic material, which has a central bore receiving a sleeve 16 which in its turn is slipped on a collar bolt 11. The screw-threaded outer end of the bolt 11 receives an eye-nut 10, which is screwed thereon until it abuts against the outer end of sleeve 16. The eye-nut is wider than sleeve 16 and its end thus forms an abutment. The eye 22 is hung on or receives an axle 8 passing through a lug 23 made integral with the brake shoe at a point substantially opposite the lug 20 of the bracket. The pins or axles received in the apertures of the ear 19 and eye 22 have a certain play which, for the pin 8 and eye 22, has been indicated in Figure 2 by the numeral 28. A helical spring 14 surrounds the sleeve 16. One end of the spring 14 is applied against the abutment provided by the eye-nut 10 and the opposite end of the spring presses against a washer 13 which is applied against the end face of the piston 15 remote from the bolt head 12. Thus, the spring 14 tends to compress the piston 15 in the axial direction between the head 12 and washer 13. This axial compression results in expansion of piston 15 in the radial direction into frictional contact with the inner surface of cylinder 17. The bore of the cylinder is preferably slightly conical, being wider at the open end facing the brake shoe, and narrower at its bottom end. Near the bottom, the cylinder has an opening 18 through which the inner cylinder chamber is vented or communicates with the atmosphere.

When the brake is operated the brake shoe moves towards the inner face of the drum and exerts a pull on the bolt 11 whose head 12 presses against the inner face of the piston. The latter, owing to its elasticity, can yield to this pull and is elastically deformed without altering its position relative to the cylinder 17. This deformation of the piston, and the play of the pivotal connections between the parts 19—20 and 22—23 are so calculated as to permit the movement of the brake shoe through the pre-arranged normal width of the gap. When this gap becomes wider and the brake shoe has accordingly to travel through a larger or excessive distance for full braking action, the elastic deformation of the piston 15 and the play in the pivotal connections are no longer sufficient for permitting the necessary movement of the brake shoe without changing the location of piston 15 within the cylinder 17. The brake shoe, when traveling this excessive distance under the force of the hydraulic cylinder, pulls the bolt 11 and causes the piston to overcome the frictional drag of the contact with the cylinder so that the piston follows the movement of the bolt 11 by a sliding movement within the cylinder 17. This sliding movement is additional to the elastic deformation of the piston and corresponds to the excess width of the gap. When the brake is next released, the spring 6 retracts the brake shoe into inoperative position but the force exerted by spring 6 is not sufficient to shift the piston 15 back into its original position. The brake shoe thus assumes a new inoperative position in which the brake lining is again spaced from the brake drum surface by the pre-arranged gap.

Since the self-adjusting device is responsive to even small enlargements of the gap, the readjustment proceeds by virtually imperceptible steps during the whole lifetime of the brake lining, and no positive or manual readjustment is required.

It is a matter of course that the position of the device may be inverted, i. e. the cylinder bottom may be linked to the brake shoe, and the piston rod or bolt 11 to the bracket.

I claim:

1. A brake comprising a brake drum, brake shoes mounted adjacent the drum, means to move the shoes into and out of braking engagement with the drum, and means for adjusting the position of each shoe to maintain a given clearance between the shoe and the drum to compensate for wear therebetween, said adjusting means comprising a cylinder member, an elastically deformable piston member mounted in said cylinder member, spring means compressing said piston member to expand the piston member into friction contact with the cylinder member wall, and means pivotally connecting one of said members to a shoe and the other to a fixed bracket.

2. A brake as in claim 1, wherein one of said pivotal connecting means comprises a pin and a member having an enlarged opening loosely receiving said pin.

3. A brake comprising a brake drum, a fixed bracket within said drum, brake shoes mounted movably on said bracket adjacent said drum, means to move said shoes into and out of braking engagement with said drum, and means for adjusting the out of engagement position of each shoe to maintain a given clearance between the related shoe and the drum to compensate for wear therebetween, said adjusting means including a cylinder member, an elastically deformable piston member mounted in said cylinder member, spring means compressing said piston member axially to expand the piston member radially into friction contact with the internal surface of said cylinder member, and means pivotally connecting one of said members to the related brake shoe and the other of said members to said bracket, said connecting means having play therein substantially equal to said given clearance to be maintained between the related shoe and said drum so that said related shoe may be normally moved into engagement with said drum without displacing said piston member relative to said cylinder member and so that said piston member is displaced relative to said cylinder member only when the clearance between said related shoe and said drum exceeds said given clearance.

4. A brake as in claim 3; wherein said cylinder member has a tapered internal surface increasing in diameter in the direction of movement of the related shoe into engagement with said drum.

ALOIS FREUND.

REFERENCES CITED

The following references are of record in the file of this patent:

UNITED STATES PATENTS

| Number | Name | Date |
|---|---|---|
| 454,243 | Witham | June 16, 1891 |
| 1,019,504 | McCombs | Mar. 5, 1912 |
| 1,021,600 | Heeter | Mar. 26, 1912 |
| 1,202,328 | Stanbury | Oct. 24, 1916 |
| 1,713,914 | O'Connor | May 21, 1929 |
| 1,802,975 | Kintzele | Apr. 28, 1931 |
| 2,212,759 | Lea | Aug. 27, 1940 |
| 2,236,777 | Ludwig | Apr. 1, 1941 |
| 2,373,508 | Snyder | Apr. 10, 1945 |
| 2,459,537 | Oberstadt | Jan. 18, 1949 |

FOREIGN PATENTS

| Number | Country | Date |
|---|---|---|
| 468,746 | Germany | July 19, 1926 |
| 493,072 | Germany | June 15, 1929 |
| 366,377 | Italy | Dec. 26, 1938 |